（12）United States Patent
Takahashi et al.

(10) Patent No.: US 9,156,448 B2
(45) Date of Patent: Oct. 13, 2015

(54) BRAKING DEVICE FOR VEHICLE

(71) Applicant: MAZDA MOTOR CORPORATION, Hiroshima (JP)

(72) Inventors: Kiyonobu Takahashi, Hatsukaichi (JP); Takanori Kume, Hiroshima (JP); Ryota Mitote, Kure (JP); Kouji Hosoda, Aki-gun (JP); Hirohito Yasumatsu, Hiroshima (JP); Takanori Kadoma, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/454,391

(22) Filed: Aug. 7, 2014

(65) Prior Publication Data
US 2015/0046054 A1 Feb. 12, 2015

(30) Foreign Application Priority Data

Aug. 12, 2013 (JP) .................................. 2013-167577

(51) Int. Cl.
*B60T 8/17* (2006.01)
*B60T 8/58* (2006.01)
*B60T 8/32* (2006.01)
*B60T 7/22* (2006.01)
*B60T 8/171* (2006.01)

(52) U.S. Cl.
CPC ... *B60T 8/17* (2013.01); *B60T 7/22* (2013.01); *B60T 8/171* (2013.01); *B60T 8/32* (2013.01); *B60T 8/58* (2013.01); *B60T 2201/022* (2013.01)

(58) Field of Classification Search
CPC ............... B60T 8/17; B60T 7/22; B60T 8/58; B60T 8/32; B60T 8/171; B60T 8/1755; B60T 8/172
See application file for complete search history.

(56) References Cited

U.S. PATENT DOCUMENTS

| | | | | |
|---|---|---|---|---|
| 5,584,542 A | * | 12/1996 | Klarer et al. ................... | 303/155 |
| 2004/0145238 A1 | * | 7/2004 | Seto et al. ..................... | 303/193 |
| 2005/0125153 A1 | * | 6/2005 | Matsumoto et al. .......... | 701/300 |
| 2005/0246086 A1 | * | 11/2005 | Motosugi et al. ............... | 701/78 |
| 2011/0073419 A1 | * | 3/2011 | Matsuzaki et al. ......... | 188/106 P |
| 2012/0073285 A1 | * | 3/2012 | Sakuma ......................... | 60/538 |
| 2012/0102941 A1 | * | 5/2012 | Yamada et al. ................ | 60/545 |
| 2012/0239266 A1 | * | 9/2012 | Kato et al. ..................... | 701/70 |
| 2013/0173113 A1 | * | 7/2013 | Takiguchi et al. ............. | 701/36 |

FOREIGN PATENT DOCUMENTS

| | | | |
|---|---|---|---|
| JP | 2004-280489 A | 10/2004 | |
| JP | 2005-082041 A | 3/2005 | |

\* cited by examiner

*Primary Examiner* — Rodney Butler
(74) *Attorney, Agent, or Firm* — Studebaker & Brackett PC

(57) ABSTRACT

A braking device for a vehicle comprises an accelerator-opening detector, a distance detector, an obstacle detector, and an ECU which is configured to perform the process of executing automatic braking when the distance detected by the distance detector is a specified distance or less during traveling of the vehicle, cancelling the automatic braking when the accelerator opening detected by the accelerator-opening detector is a specified opening or greater, and prohibiting the cancelling of the automatic braking when the front obstacle is detected by the obstacle detector while the vehicle stops or travels at a low speed which is a specified speed or less. Thereby, the braking device for a vehicle which can surely reduce the damage caused by the vehicle's collision with the front obstacle can be provided.

6 Claims, 4 Drawing Sheets

BRAKING DEVICE FOR VEHICLE

BACKGROUND OF THE INVENTION

The present invention relates to a braking device for a vehicle, and in particular relates to a braking device for a vehicle which can reduce damage caused by vehicle's collision with a front obstacle, which includes an object existing in front of the vehicle or another vehicle traveling in front of the vehicle, by using braking of the vehicle.

Conventionally, a braking device for a vehicle which reduces damage caused by vehicle's collision with another vehicle traveling in front of the vehicle by using braking of the vehicle when the vehicle approaches another vehicle traveling in front of the vehicle (i.e., a front-traveling vehicle) is known.

For example, Japanese Patent Laid-Open Publication No. 2005-82041 discloses an automatic braking device of a vehicle which increases a pedal reaction force of an acceleration pedal (i.e., an accelerator) of the vehicle and operates automatic braking in a case in which the vehicle may possibility collide with an obstacle positioned in front of the vehicle. In this automatic braking device, in a case in which a driver operates the acceleration pedal after the automatic braking is operated, this acceleration pedal's operation is considered as a driver's intentional action, so that an automatic braking control is canceled.

A collision prevention control device which limits starting or accelerating of a vehicle, in a case in which an acceleration pedal is operated mistakenly when an obstacle exists in front of the vehicle, so as to prevent the vehicle from colliding with the obstacle is also known.

For example, Japanese Patent Laid-Open Publication No. 2004-280489 discloses a collision prevention control device in which when a vehicle approaches an obstacle and the distance to the obstacle becomes a specified distance or less while the vehicle stops or travels at a low speed, a throttle opening is limited or an automatic braking is operated so as to limit starting or accelerating of the vehicle.

Herein, it may be considered that both of the conventional braking device for a vehicle disclosed in the former patent document and the conventional collision prevention control device disclosed in the latter patent document are installed to the vehicle.

However, in a case in which the conventional braking device for a vehicle and the conventional collision prevention control device are installed to the vehicle together, there is a problem in that both functions of these devices may not be compatible. For example, in a case in which the acceleration pedal is operated when the distance to the obstacle is the specified distance or less while the vehicle stops or travels at the low speed and the starting or accelerating of the vehicle is limited by the collision prevention control device accordingly, the braking device for a vehicle may recognize that the acceleration pedal's operation is intentional, so that the braking device may cancel the automatic braking control. Thus, there is a problem in that the collision prevention control device may not be able to operate the automatic braking, so that the vehicle may not be able to be stopped properly.

SUMMARY OF THE INVENTION

The present invention has been devised in order to solve the above-described problem, and an object of the present invention is to provide a braking device for a vehicle which can surely reduce the damage caused by the vehicle's collision with the front obstacle.

According to the present invention, there is provided a braking device for a vehicle, comprising an accelerator-opening detector to detect an accelerator opening of the vehicle, a distance detector to detect a distance to a front obstacle which is positioned in front of the vehicle, an obstacle detector to detect the front obstacle, a brake adjustor to adjust a breaking force applied to a brake device of the vehicle, and a controller to control the brake adjustor based on detections of the accelerator-opening detector, the distance detector, and the obstacle detector, wherein the controller is configured to perform the process of executing automatic braking when the distance detected by the distance detector is a specified distance or less during traveling of the vehicle, cancelling the automatic braking when the accelerator opening detected by the accelerator-opening detector is a specified opening or greater, and prohibiting the cancelling of the automatic braking when the front obstacle is detected by the obstacle detector while the vehicle stops or travels at a low speed which is a specified speed or less.

According to the present invention, the automatic braking is executed when the distance between the vehicle and the front obstacle is the specified distance or less. Herein, the automatic braking is cancelled when the accelerator opening is the specified opening or greater, but this cancelling of the automatic braking is prohibited when the front obstacle is detected while the vehicle stops or travels at the low speed which is the specified speed or less. Accordingly, the cancelling of the automatic braking is not conducted (i.e., the automatic braking is not cancelled) when the obstacle is detected in front of the vehicle, despite the accelerator opening being the specified angle or greater (regardless of the magnitude of the accelerator opening). Thereby, the automatic braking can be executed properly. Accordingly, the vehicle can be decelerated or stopped properly, so that the damage caused by the vehicle's collision with the front obstacle can be reduced surely. Meanwhile, since the canceling of the automatic braking is not prohibited when the vehicle travels at the high speed greater than the specified speed, which may be high-possibly caused by a drier's intentional acceleration pedal's operation, the automatic braking can be cancelled properly, so that the vehicle can be started or accelerated surely.

According to an embodiment of the present invention, the controller is further configured to perform the process of counting how many times the automatic braking is executed when the cancelling of the automatic braking is prohibited and not prohibiting the cancelling of the automatic braking when the counted time is a specified time or greater. Thereby, the cancelling of the automatic braking is not prohibited when the automatic braking is executed more than the specified time while the cancelling of the automatic braking is prohibited. Accordingly, when the automatic braking is executed more than the specified time while the cancelling of the automatic braking is prohibited, the automatic braking can be cancelled when the accelerator opening is the specified opening or greater. Accordingly, the damage caused by the vehicle's collision with the front obstacle can be reduced surely by executing the automatic braking, and also the automatic braking can be cancelled in the case in which there is the high possibility that the acceleration pedal's operation is intentionally conducted by the driver, so that the vehicle can be started or accelerated surely.

According to another embodiment of the present invention, the controller is further configured to perform the process of measuring the time (term) how long the cancelling of the automatic braking is prohibited and not prohibiting the cancelling of the automatic braking when the measured time is a specified time or greater. Thereby, the cancelling of the automatic braking is not prohibited when the time (term) how long the cancelling of the automatic braking is prohibited is the specified time or greater. Accordingly, when the time (term) how long the cancelling of the automatic braking is prohibited is the specified time or greater, the automatic braking can be cancelled when the accelerator opening is the specified opening or greater. Accordingly, the damage caused by the vehicle's collision with the front obstacle can be reduced surely by executing the automatic braking, and also the automatic braking can be cancelled in a case in which the time (term) when the automatic braking is highly desired has passed, so that the vehicle can be started or accelerated surely.

Other features, aspects, and advantages of the present invention will become apparent from the following description which refers to the accompanying drawings.

DETAILED DESCRIPTION OF THE INVENTION

Hereinafter, a braking device for a vehicle according to an embodiment of the present invention will be described referring to the accompanying drawings.

Figure 1:
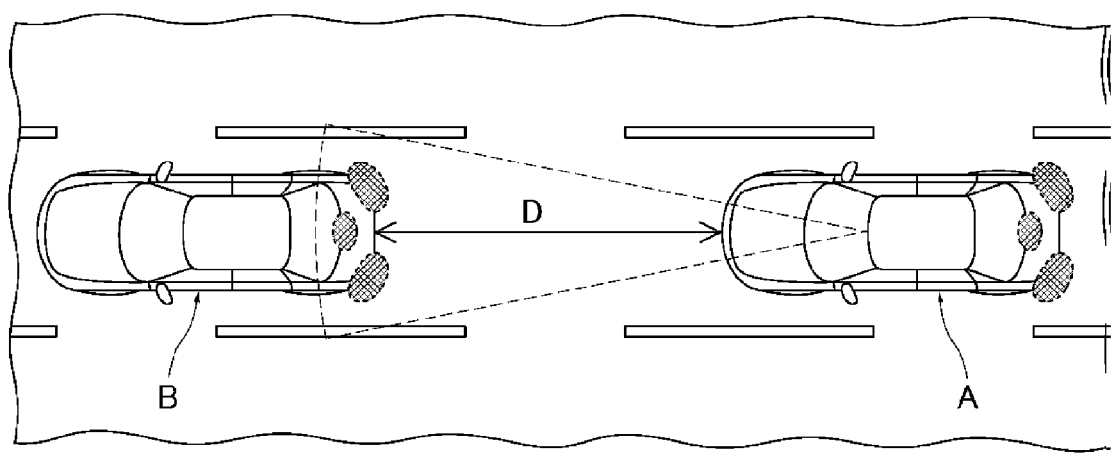
FIG. 1 is a conceptual diagram showing a distance between a vehicle equipped with a braking device for a vehicle of the present invention and another vehicle traveling in front of the vehicle.

First, the constitution of the braking device for a vehicle according to the embodiment of the present invention will be described referring to FIGS. 1 through 3. FIG. 1 is a conceptual diagram showing a distance between a vehicle equipped with the braking device for a vehicle of the present invention and another vehicle traveling in front of the vehicle, FIG. 2 is a conceptual diagram showing the vehicle equipped with the braking device for a vehicle of the present invention and a front obstacle, and FIG. 3 is a block diagram showing system constitution of the braking device for a vehicle according to the embodiment of the present invention.

First, as shown in FIG. 1, the braking device of a vehicle A according to the embodiment of the present invention determines whether or not the vehicle A can avoid collision with a front-traveling vehicle B which travels in front of the vehicle A based on a distance D between the vehicle A and the front-traveling B, a relative speed between them, and others during traveling of the vehicle A (when the traveling speed of the vehicle A is 4 km/h-30 km/h, for example). For example, the braking device of the vehicle A determines that vehicle A cannot avoid the collision with the front-traveling vehicle B in a case in which the distance D between the vehicle A and the front-traveling vehicle B is smaller than a specified braking distance which is necessary for the vehicle A to decrease its speed to a specified speed which is lower than a traveling speed of the front-traveling vehicle B. Then, when it is determined that the collision of the vehicle A with the front-traveling vehicle B is unavoidable and also an accelerator opening (the amount of pressing of an acceleration pedal) of the vehicle A is less than 30%, the braking device of the vehicle A operates braking so as to decelerate the vehicle A (the automatic braking control). Further, the braking device of the vehicle A determines based on the accelerator opening (the amount of pressing of the acceleration pedal) of the vehicle A whether or not an acceleration pedal's operation is intentionally conducted by a driver. For example, the braking device of the vehicle A determines that the acceleration pedal's operation is intentionally conducted (in order to accelerate the vehicle for a vehicle's lane change, for example) in a case in which the accelerator opening is 30% or greater. Then, when it is determined that the acceleration pedal's operation is intentionally conducted, the braking device of the vehicle A cancels the automatic braking control so as to put the vehicle A in a normal state in which the vehicle A can be accelerated.

Figure 2:
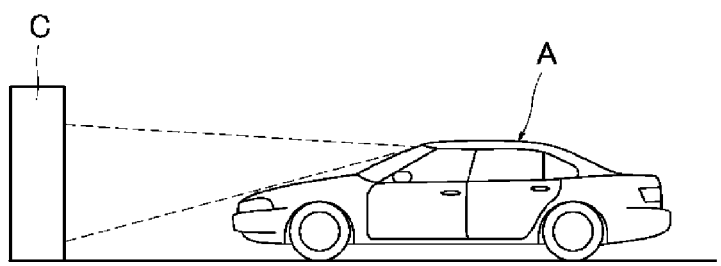
FIG. 2 is a conceptual diagram showing the vehicle equipped with the braking device for a vehicle of the present invention and a front obstacle.

The braking device of the vehicle A further determines whether or not a front obstacle C as shown in FIG. 2. Then, when the front obstacle C exists and also the accelerator opening is 50% or greater while the vehicle A stops or travels at a low speed (when the traveling speed of the vehicle A is 15 km/h or lower, for example), the braking device of the vehicle A suppresses an engine output so as to prevent the vehicle A from starting suddenly (the erroneous-start suppression control).

Figure 3:
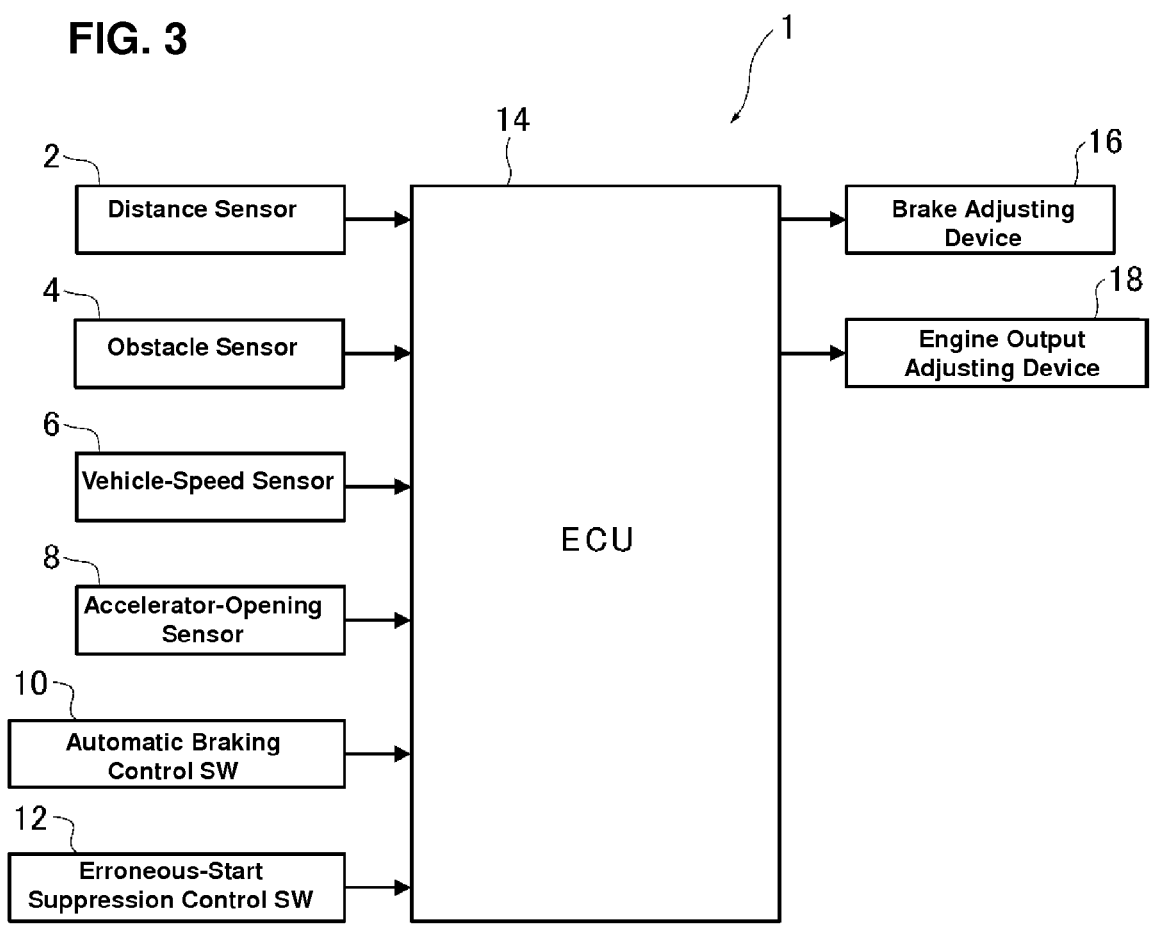
FIG. 3 is a block diagram showing system constitution of the braking device for a vehicle according to an embodiment of the present invention.

In FIG. 3, reference character 1 denotes the braking device according to the embodiment of the present invention, and this braking device 1 of the vehicle A comprises a distance sensor 2 which detects the distance D between the vehicle A and the front-traveling vehicle B, an obstacle sensor 4 which detects the front obstacle C, a vehicle-speed sensor 6 which detects a vehicle speed, an accelerator-opening sensor 8 which detects an accelerator opening, an automatic braking control switch 10 which switches ON/OFF of the automatic braking control, and an erroneous-start suppression control switch 12 which switches ON/OFF of the erroneous-start suppression control. The distance sensor 2, which comprises of a millimeter-wave radar or a lazar radar to detect an object positioned in front of the vehicle, detects whether or not the front-traveling vehicle B exists and also detects the distance D between the front-traveling vehicle B and the vehicle A. The obstacle sensor 4, which comprises an infrared sensor to detect an object positioned in front of the vehicle, detects whether or not the front obstacle C exists.

The braking device 1 further comprises an ECU 14 to execute the automatic braking control and the erroneous-start suppression control, to which signals from the respective sensors and switches are inputted. The ECU 14 outputs control signals to a brake adjusting device 16 and an engine output adjusting device 18 based on the signals inputted from the above-described sensors and switches. The brake adjusting device 16 adjusts a braking force of a brake device of the vehicle with the control signal outputted from the ECU 14. The engine output adjusting device 18 adjusts a throttle-valve opening and a fuel-injection amount of an engine, thereby an output of the engine, with the control signal outputted from the ECU 14. This ECU 14 is comprised of a computer which includes CPU, various programs (including a basic control program, such as OS, and application programs), and internal memories to store programs and data thereat, such as ROM and RAM.

Figure 4:
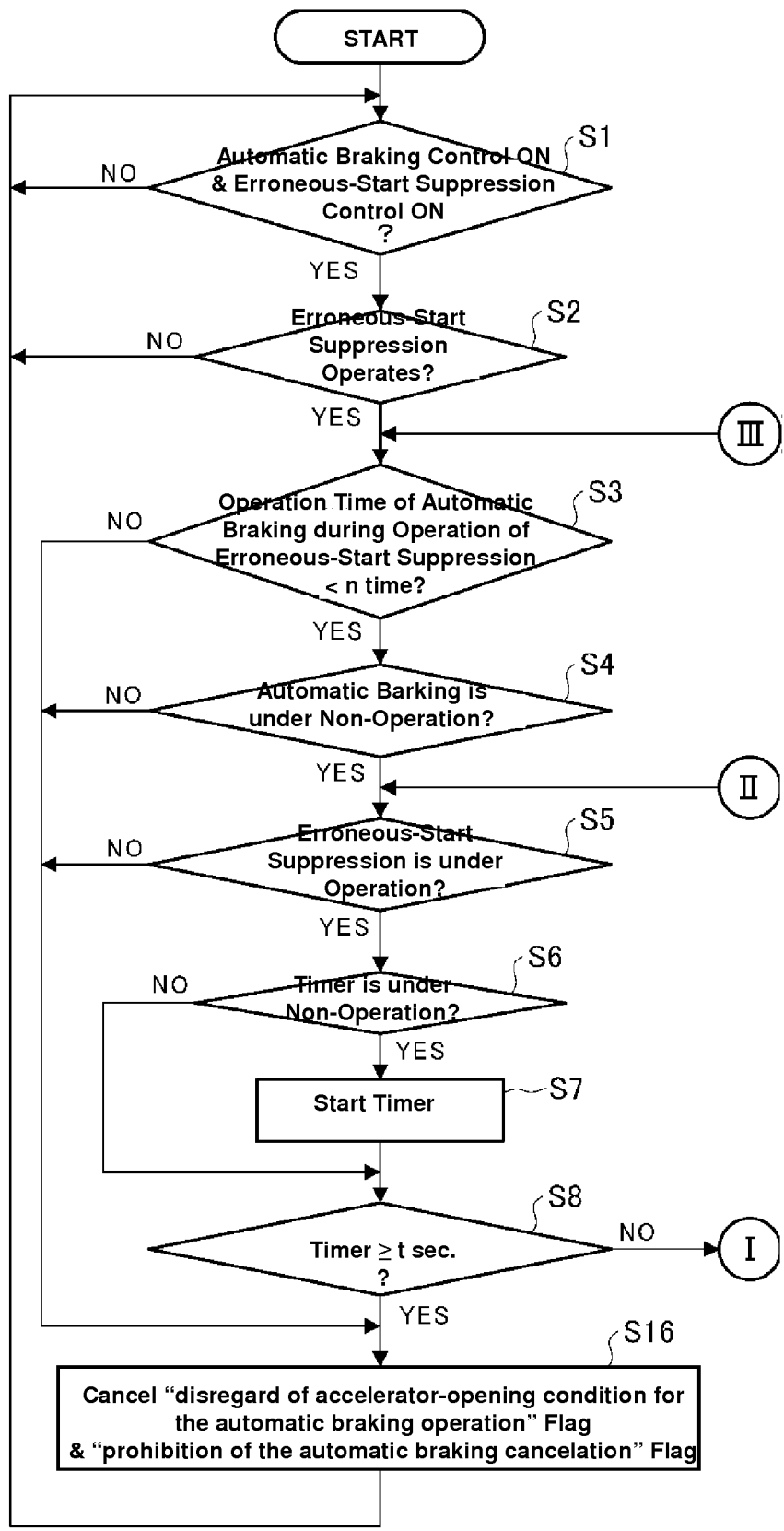
FIG. 4 is a flowchart showing contents of control contents of the braking device for a vehicle according to the embodiment of the present invention.
Figure 5:
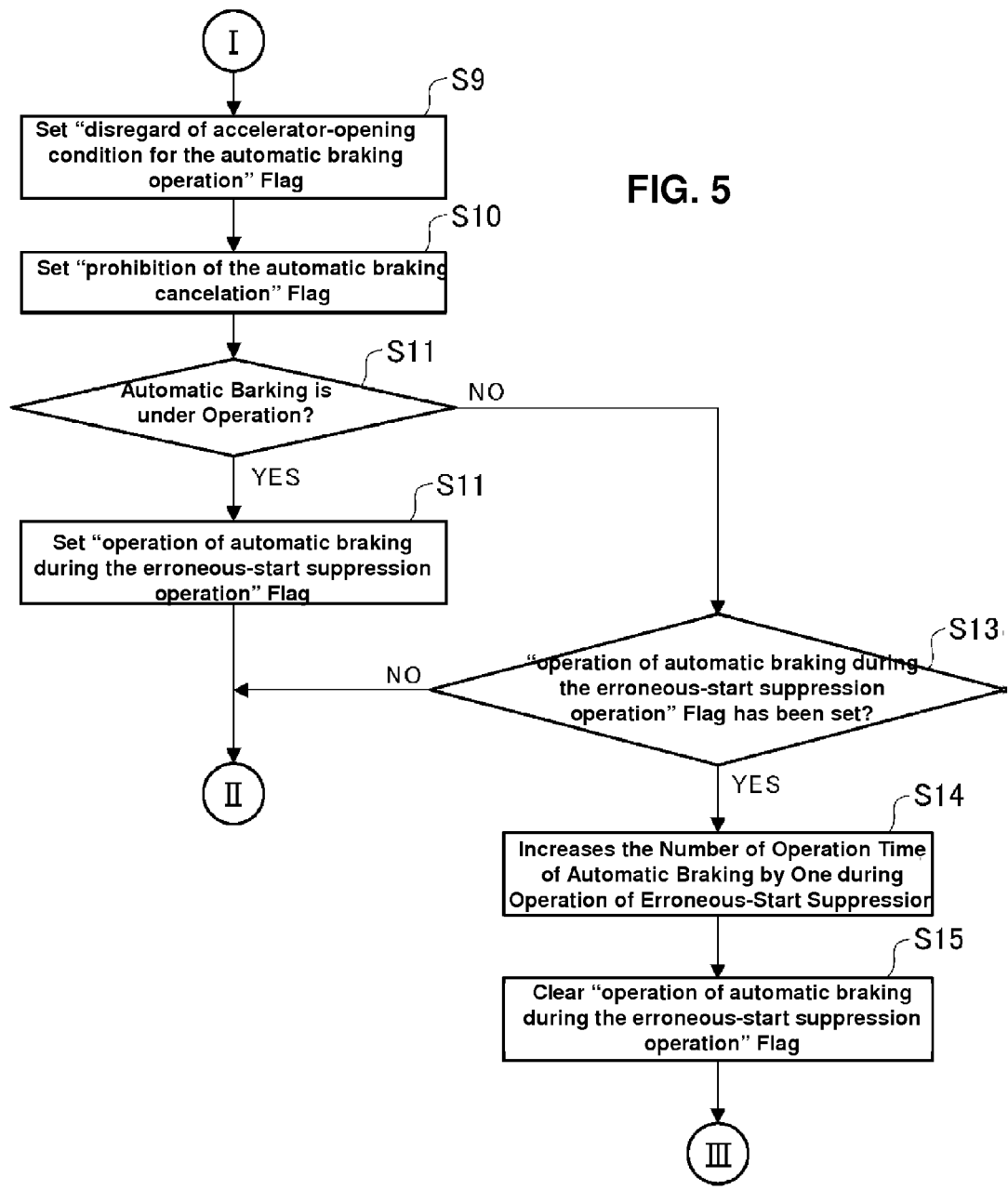
FIG. 5 is a flowchart showing other control contents of the braking device for a vehicle according to the embodiment of the present invention, which is subsequent from the control contents shown in FIG. 4.

Next, the control contents of the braking device 1 according to the embodiment of the present invention will be described referring to FIGS. 4 and 5. FIGS. 4 and 5 are flowcharts showing the control contents of the braking device 1 according to the embodiment of the present invention. The controls of the braking device 1 are started when an ignition of the vehicle is turned on and thereby the braking device 1 is powered, and executed repeatedly. Reference characters S show respective steps of control processing in FIG. 4.

Herein, when the ignition of the vehicle is turned on, the automatic braking control and the erroneous-start suppression control become ON through an initial setting, and then ON/OFF of the automatic braking control or the erroneous-start suppression control is switched through a driver's operation of the automatic braking control switch 10 or the erroneous-start suppression control switch 12. The ECU 14 executes processing of the automatic braking control and/or the erroneous-start suppression control which are ON, in parallel with the controls shown in FIGS. 4 and 5.

Specifically, in a case in which the automatic braking control switch 10 is turned on, when it is determined, based on the distance D detected by the distance sensor 2, the relative speed and others, that the collision of the vehicle A with the front-traveling vehicle B is unavoidable and when the accelerator opening of the vehicle A is less than the specified opening (30%, for example), the ECU 14 operates the brake device with the brake adjusting device 16, thereby decelerating the vehicle A.

Further, the braking device 14 determines that the acceleration pedal's operation is intentionally conducted in a case in which the accelerator opening detected by the accelerator-opening sensor 8 is the specified opening (30%, for example) or greater when the brake device is operated with the brake adjusting device 16. At this time, the ECU 14 cancels the operation of the brake device by means of the brake adjusting device 16, thereby putting the vehicle A in a normal state in which the vehicle A can be accelerated.

Further, in a case in which the erroneous-start suppression control switch 12 is turned on, when the front obstacle C is detected by the obstacle sensor 4 and also when the accelerator opening detected by the accelerator-opening sensor 8 is the specified opening (50%, for example) or greater while the vehicle A stops or travels at the low speed (when the traveling speed of the vehicle A detected by the vehicle-speed sensor 6 is 15 km/h or lower, for example), the ECU 14 suppresses the engine output, thereby preventing the vehicle A from starting suddenly.

Moreover, the braking device 1 performs, in the controls shown in FIGS. 4 and 5, permission or prohibition of cancelling of braking by means of the automatic braking control (hereinafter, referred to as "automatic braking") in a case in which the above-described automatic braking control and erroneous-start suppression control are executed, in order to make these two controls be compatible.

As shown in FIG. 4, the ECU 14 determines in step S1 first whether or not both the automatic braking control switch 10 and the erroneous-start suppression control switch 12 are turned on. When the automatic braking control switch 10 and the erroneous-start suppression control switch 12 are not turned on (the automatic braking control switch 10 or the erroneous-start suppression control switch 12 are in an off state), the control is repeated until both the automatic braking control switch 10 and the erroneous-start suppression control switch 12 are turned on.

Meanwhile, when it is determined in the step S1 that the automatic braking control switch 10 and the erroneous-start suppression control switch 12 are turned on, the control proceeds to step S2, where the ECU 14 determines whether or not the engine-output suppression (hereinafter, referred to as "erroneous-start suppression") by means of the engine-output adjusting device 18 operates. When the erroneous-start suppression does not operate, the control of the ECU 14 returns to the step S1.

Meanwhile, when it is determined in the step S2 that the erroneous-start suppression operates, that is—when the front obstacle C is detected by the obstacle sensor 4 and the accelerator opening detected by the accelerator-opening sensor 8 is the specified opening or greater, thereby suppressing the engine output by means of the engine-output adjusting device 18, the control proceeds to step S3, where the ECU 14 determines whether or not an operation time of the automatic braking (i.e., how many times the automatic braking operates) during the operation of the erroneous-start suppression is less than a specified n time (one time (i.e., once), for example). Herein, the operation time of the automatic braking during the operation of the erroneous-start suppression is set at 0 (zero) as its initial value when the ignition of the vehicle is tuned on, and the number of this operation time increases one by one whenever the automatic braking operates during the operation of the erroneous-start suppression (i.e., increment operation). This updated increment number of the operation time is kept until the ignition of the vehicle is turned off.

When the operation time of the automatic braking during the operation of the erroneous-start suppression is less than the specified n time, the control proceeds to step S4, where the ECU 14 determines whether or not the automatic braking by the automatic braking control is under non-operation.

When the automatic braking by the automatic braking control is under non-operation, that is—when the brake adjusting device 16 does not operate the brake device of the vehicle, the control proceeds to step S5, where the ECU 14 determines whether or not the erroneous-start suppression is under operation.

When the erroneous-start suppression is under operation, the control proceeds to step S6, where the ECU 14 determines whether or not a timer stored in the ECU 14 is under non-operation. When the timer is under non-operation, the control proceeds to step S7, where the ECU 14 starts the timer. Time counting by means of this timer continues until the ignition of the vehicle is turned off, and the timer is reset when the ignition of the vehicle is turned on.

Meanwhile, when it is determined in the step S6 that the timer is not under non-operation, that is—when the timer has already operated, or after the processing of the step S7 is complete, the control proceeds to step S8, the ECU 14 determines whether or not the time counted by the timer is a specified t sec. (3 sec., for example) or greater.

When the time counted by the timer is less than the specified t sec., the control proceeds to step S9 of FIG. 5, where the ECU 14 sets a "disregard of accelerator-opening condition for the automatic braking operation" flag. In a case in which the "disregard of accelerator-opening condition for the automatic braking operation" flag is set, when it is determined based on the distance D to the front-raveling vehicle B detected by the distance sensor 2, the relative speed and others that the collision of the vehicle A with the front-traveling vehicle B is unavoidable, the ECU 14 operates the brake device with the brake adjusting device 16, despite the accelerator opening being less than the specified angle (30%, for example), thereby decelerating the vehicle A. Herein, the above-described "disregard of accelerator-opening condition for the automatic braking operation" flag has not been set at the initial state.

Next, the control proceeds to step S10, where the ECU 14 sets a "prohibition of the automatic braking cancelation" flag. In a case in which the "prohibition of the automatic braking cancelation" flag is set, the ECU 14 does not operate the brake device with the brake adjusting device 16, despite the accelerator opening being the specified angle (30%, for example) or greater. Herein, the above-described "prohibition of the automatic braking cancelation" flag has not been set at the initial state.

Next, the control proceeds to step S11, where the ECU 14 determines whether or not the automatic braking by the automatic braking control is under operation. When the automatic braking is under operation, that is—when the brake adjusting device 16 operates the brake device, the control proceeds to step S12, where the ECU 14 sets an "operation of automatic braking during the erroneous-start suppression operation" flag. Herein, the above-described "operation of automatic braking during the erroneous-start suppression operation" flag has not been set at the initial state. Subsequently, the control of the ECU 14 returns to the step S5 of FIG. 4. Then, the ECU 14 repeats the processing from the steps S5 through S12 until it is determined in the step S5 that the erroneous-start suppression is not under operation (that is—the suppression of the engine output by the engine-output adjusting device 18 does not operate), or it is determined in the step S8 that the time counted by the timer is the specified t sec. (3 sec., for example) or greater.

When it is determined in the step S11 of FIG. 5 that the automatic braking by the automatic braking control is not under operation, the control proceeds to step S13, where the ECU 14 determines whether or not the "operation of automatic braking during the erroneous-start suppression operation" flag has been set. When it is determined that the "operation of automatic braking during the erroneous-start suppression operation" flag has not been set, the control of the ECU 14 returns to the step S5 of FIG. 4.

Meanwhile, when it is determined that the "operation of automatic braking during the erroneous-start suppression operation" flag has been set, the control proceeds to step S14, where the ECU 14 increases the number of the operation time of the automatic braking by one during the operation of the erroneous-start suppression (i.e., increment operation).

Then, the control proceeds to step S15, where the ECU 14 changes the "operation of automatic braking during the erroneous-start suppression operation" flag to an unset state (i.e., clear this flag). Next, the control of the ECU 14 returns to the step S3 of FIG. 4. The ECU 14 repeats the processing from the steps S3 through S15 until it is determined in the step S3 that the operation time of the automatic braking during the operation of the erroneous-start suppression is the specified n time or greater, it is determined in the step S4 that the automatic braking by the automatic braking control is not under non-operation, that is—that the automatic braking operates, it is determined in the step S5 that the erroneous-start suppression is not under operation (i.e., the engine-output suppression by the engine-output adjusting device 18 does not operate), or it is determined in the step S8 that the time counted by the timer is a specified t sec. (3 sec., for example) or greater.

Further, when it is determined in the step S3 that the operation time of the automatic braking during the operation of the erroneous-start suppression is the specified n time or greater, it is determined in the step S4 that the automatic braking by the automatic braking control is not under non-operation, that is—that the automatic braking operates, it is determined in the step S5 that the erroneous-start suppression is not under operation, or it is determined in the step S8 that the time counted by the timer is a specified t sec. (3 sec., for example) or greater, the control proceeds to step S16, where the ECU 14 clears the "disregard of accelerator-opening condition for the automatic braking operation" flag and the "prohibition of the automatic braking cancelation" flag. Thereby, when it is determined, based on the distance D to the front-traveling vehicle B detected by the distance sensor 2, the relative speed and others, that the collision of the vehicle A with the front-traveling vehicle B is unavoidable, the ECU 14 operates the brake device with the brake adjusting device 16 as long as the accelerator opening is less than the specified opening (30%, for example), thereby decelerating the vehicle A. Further, the ECU 14 cancels the operation of the brake device by means of the brake adjusting device 16 in the case in which the accelerator opening detected by the accelerator-opening sensor 8 is the specified opening (30%, for example) or greater when the brake device is operated with the brake adjusting device 16. After the processing of the step S16, the control of the ECU 14 returns to the step S1.

Next, a modification of the embodiment of the present invention will be described. While the braking device 1 of the above-described embodiment of the present invention comprises the distance sensor 2 which detects the existence of the front-traveling vehicle B and the distance D between the vehicle A and the front-traveling vehicle B and the obstacle sensor 4 which detects the front obstacle C existing in front of the vehicle A, there may be provided a single sensor which can detect the distance D between the vehicle A and the front-traveling vehicle B and the front obstacle C existing in front of the vehicle A, in place of the distance sensor 2 and the obstacle sensor 4.

Hereafter, the operations/effects of the braking device 1 according to the above-described embodiment and modification of the present invention will be described.

First, the ECU 14 executes the automatic braking when it is determined, based on the distance D between the vehicle A and the front-traveling vehicle B and so on, that the collision of the vehicle A with the front-traveling vehicle B is unavoidable. Herein, the automatic braking is cancelled when the accelerator opening of the vehicle A is the specified opening or greater, but this cancelling of the automatic braking is prohibited when the erroneous-start suppression operates, that is—when the front obstacle C including the front-traveling vehicle B is detected while the vehicle A stops or travels at the low speed which is the specified speed or less. Accordingly, the cancelling of the automatic braking is not conducted (i.e., the automatic braking is not cancelled) when the front obstacle C including the front-traveling vehicle B is detected in front of the vehicle A, despite the accelerator opening being the specified angle or greater (regardless of the magnitude of the accelerator opening). Thereby, the ECU 14 can execute the automatic braking. Accordingly, the vehicle A can be decelerated or stopped, so that the damage caused by the vehicle's collision with the front obstacle C including the front-traveling vehicle B can be reduced surely. Meanwhile, since the ECU 14 does not prohibit the canceling of the automatic braking when the vehicle A travels at the high speed greater than the specified speed, which may be high-possibly caused by a drier's intentional acceleration pedal's operation, the automatic braking can be cancelled properly, so that the vehicle A can be started or accelerated surely.

Particularly, the ECU 14 does not prohibit the cancelling of the automatic braking when the automatic braking is executed more than the specified n time while the cancelling of the automatic braking is prohibited. Accordingly, the ECU 14 can cancel the automatic braking when the accelerator opening is the specified opening or greater in a case in which the automatic braking is executed more than the specified n time while the cancelling of the automatic braking is prohibited. Accordingly, the damage caused by the vehicle's collision with the front obstacle C including the front-traveling vehicle B can be reduced surely by executing the automatic braking, and also the automatic braking can be cancelled in the case in which there is the high possibility that the acceleration pedal's operation is intentionally conducted by the driver, so that the vehicle A can be started or accelerated surely.

Further, the ECU 14 does not prohibit the cancelling of the automatic braking when the time (term) how long the cancelling of the automatic braking is prohibited is the specified t sec. or greater. Accordingly, the ECU 14 can cancel the automatic braking when the accelerator opening is the specified opening or greater in a case in which the time (term) how long the cancelling of the automatic braking is prohibited is the specified t sec. or greater. Accordingly, the damage caused by the vehicle's collision with the front obstacle C including the front-traveling vehicle B can be reduced surely by executing the automatic braking, and also the automatic braking can be cancelled in a case in which the time when the automatic braking is highly desired has passed, so that the vehicle A can be started or accelerated surely.

The present invention should not be limited to the above-described embodiment and modification, and any other modifications or improvements may be applied within the scope of the claimed invention.

What is claimed is:

1. A braking device for a vehicle, comprising:
    a vehicle-speed detector to detect a vehicle speed of the vehicle;
    an accelerator-opening detector to detect an accelerator opening of the vehicle;
    a distance detector to detect a distance between the vehicle and a front obstacle;
    an obstacle detector to detect the front obstacle;
    a brake adjustor to adjust a breaking force applied to a brake device of the vehicle; and
    a controller to control the brake adjustor based on detections of the vehicle-speed detector, the accelerator-opening detector, the distance detector, and the obstacle detector,
    wherein said controller is configured to perform the process of:
    executing automatic braking when the distance detected by said distance detector is a specified distance or less during traveling of the vehicle;
    cancelling said automatic braking when the accelerator opening detected by said accelerator-opening detector is a specified opening or greater; and
    prohibiting said cancelling of the automatic braking when the front obstacle is detected by said obstacle detector while the vehicle stops or travels at a low speed which is a specified speed or less despite the accelerator opening being the specified angle or greater, but not prohibiting said cancelling of the automatic braking while the vehicle travels at a high speed which is greater than the specified speed so as to cancel the automatic braking.

2. The braking device for a vehicle of claim 1, wherein said controller is further configured to perform the process of:
    counting how many times the automatic braking is executed when said cancelling of the automatic braking is prohibited; and
    not prohibiting the cancelling of the automatic braking when said counted times is a specified time or greater.

3. The braking device for a vehicle of claim 1, wherein said controller is further configured to perform the process of:
    measuring the time how long said cancelling of the automatic braking is prohibited; and
    not prohibiting the cancelling of the automatic braking when said measured time is a specified time or greater.

4. The braking device for a vehicle of claim 2, wherein said controller is further configured to perform the process of:
    measuring the time how long said cancelling of the automatic braking is prohibited; and
    not prohibiting the cancelling of the automatic braking when said measured time is a specified time or greater.

5. A braking device for a vehicle, comprising:
    an accelerator-opening detector to detect an accelerator opening of the vehicle;
    a distance detector to detect a distance between the vehicle and a front obstacle;
    an obstacle detector to detect the front obstacle;
    a brake adjustor to adjust a breaking force applied to a brake device of the vehicle; and
    a controller to control the brake adjustor based on detections of the accelerator-opening detector, the distance detector, and the obstacle detector,
    wherein said controller is configured to perform the process of:
    executing automatic braking when the distance detected by said distance detector is a specified distance or less during traveling of the vehicle;
    cancelling said automatic braking when the accelerator opening detected by said accelerator-opening detector is a specified opening or greater;
    prohibiting said cancelling of the automatic braking when the front obstacle is detected by said obstacle detector while the vehicle stops or travels at a low speed which is a specified speed or less;
    counting how many times the automatic braking is executed when said cancelling of the automatic braking is prohibited; and
    not prohibiting the cancelling of the automatic braking when said counted times is a specified time or greater.

6. The braking device for a vehicle of claim 5, wherein said controller is further configured to perform the process of:
    measuring the time how long said cancelling of the automatic braking is prohibited; and
    not prohibiting the cancelling of the automatic braking when said measured time is a specified time or greater.

* * * * *